United States Patent [19]

Reusch

[11] Patent Number: 4,648,227
[45] Date of Patent: Mar. 10, 1987

[54] LOW SHOCK EXPLOSIVE JOINT SYSTEMS

[75] Inventor: David C. Reusch, Seattle, Wash.

[73] Assignee: The Boeing Company, Seattle, Wash.

[21] Appl. No.: 779,246

[22] Filed: Sep. 23, 1985

[51] Int. Cl.⁴ .................................................. F42B 15/10
[52] U.S. Cl. ........................................ 52/419; 52/232; 102/378
[58] Field of Search .................. 102/377, 378; 60/225; 52/98, 232, 419

[56] References Cited

U.S. PATENT DOCUMENTS

| | | | |
|---|---|---|---|
| 3,135,163 | 6/1964 | Mechlin, Jr. et al. | 89/5 |
| 3,172,330 | 3/1965 | Lidmalm et al. | 89/1.7 |
| 3,177,655 | 4/1965 | White | 102/378 |
| 3,362,290 | 1/1968 | Carr et al. | 102/378 |
| 3,453,960 | 7/1969 | Qualls | 102/378 |
| 3,465,482 | 9/1969 | Chandler | 52/3 |
| 3,486,410 | 12/1969 | Drexelius et al. | 102/275.4 |
| 3,505,925 | 4/1970 | Carr | 102/378 |
| 3,633,456 | 1/1972 | Carr et al. | 102/378 |
| 3,698,281 | 10/1972 | Brandt et al. | 102/378 |
| 3,948,143 | 4/1976 | Olsen | 89/1.14 |
| 4,137,848 | 2/1979 | Cunha | 102/378 |
| 4,407,468 | 10/1983 | Bement et al. | 102/378 |

Primary Examiner—Deborah L. Kyle
Assistant Examiner—Ted L. Parr
Attorney, Agent, or Firm—Joan H. Pauly

[57] ABSTRACT

A pylon (70) on one structure (68) abuts a side surface of a mounting flange (64) carried by another structure (60) and is bonded thereto by an adhesive layer (76). A flattened tube (78) is positioned between pylon (70) and flange (64). Explosive cords (82) are detonated inside tube (78) to expand tube (78) to a rounded configuration. This causes pylon (70) to peel away from flange (64) and to peel adhesive layer (76) to thereby release structures (60,68) from each other. In another embodiment, a structure (4) has a wall (6) including an outer skin (8), an inner skin (10), and a honeycomb core (12). Outer end portions (14,20) of skins (8,10) form two mounting flanges that are bonded by adhesive layers (40,42) to opposite surfaces of a mounting flange (32) carried by another structure (28). Detonation of explosive cords (50) inside two expandable members (46,46') causes skin flanges (14,20) to peel away from flange (32) and peel layers (40,42).

20 Claims, 11 Drawing Figures

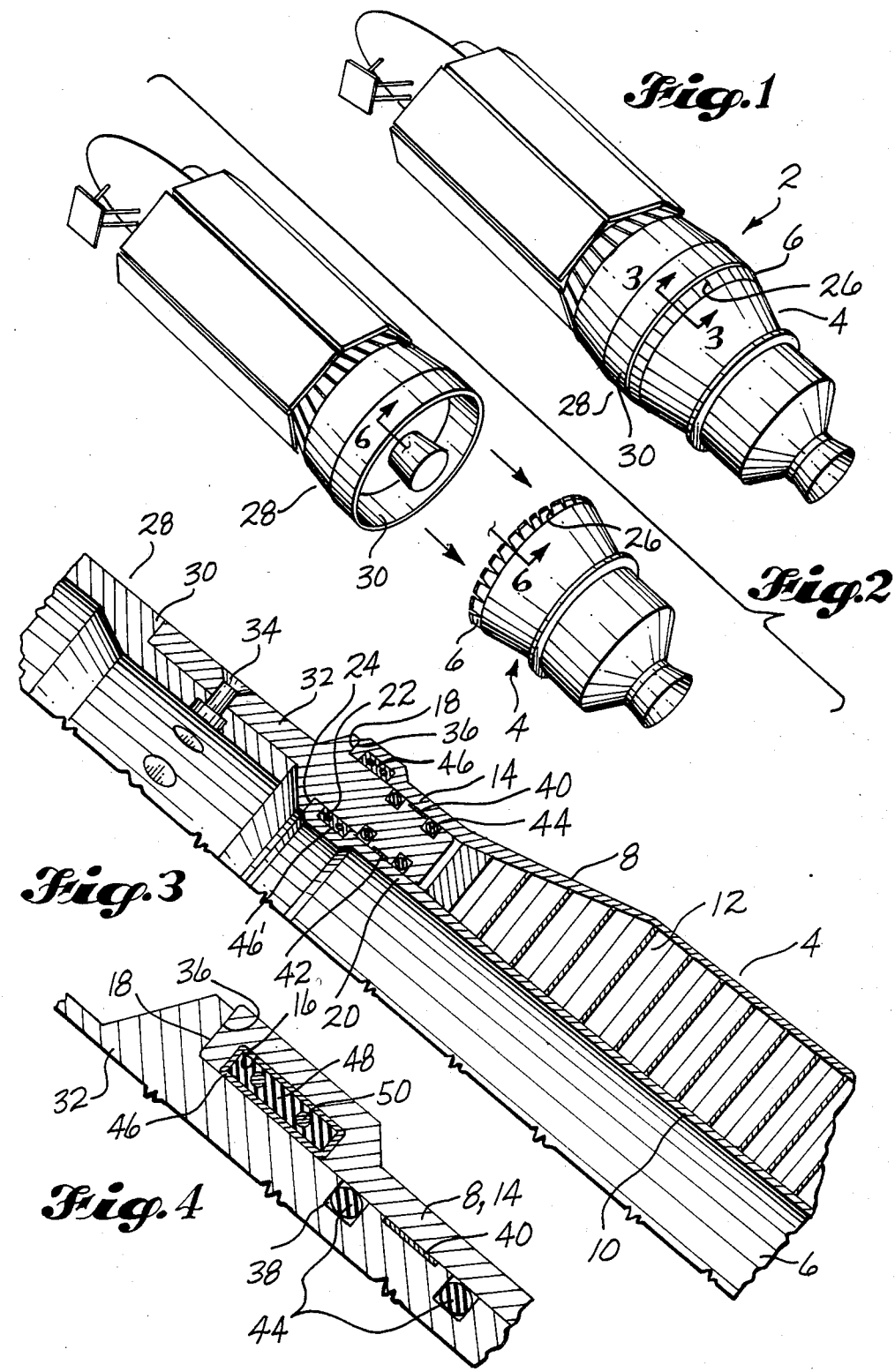

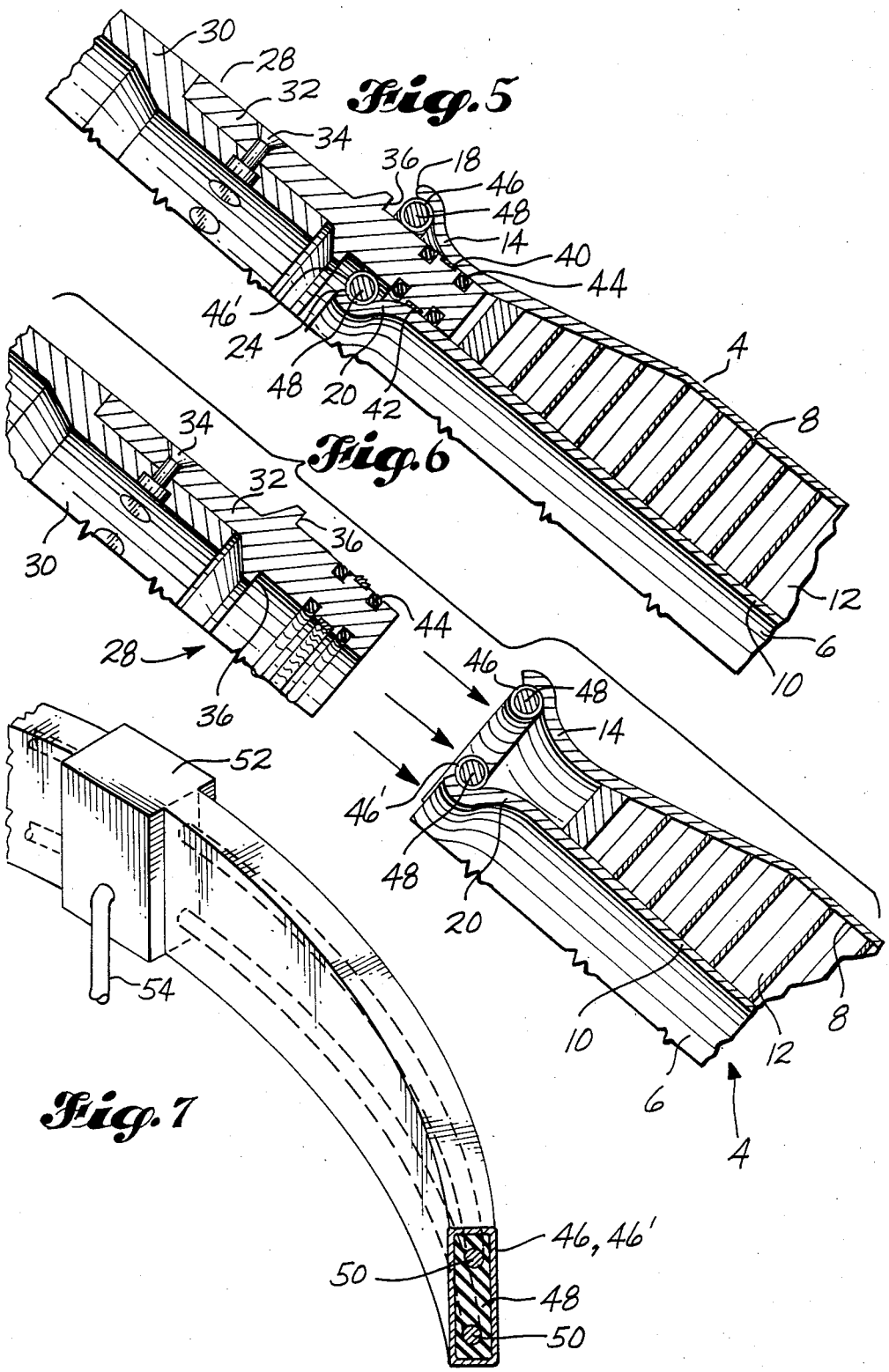

LOW SHOCK EXPLOSIVE JOINT SYSTEMS

DESCRIPTION

TECHNICAL FIELD

This invention relates to explosive joint systems and, more particularly, to such a system in which two structures are adhesively bonded together and explosives are detonated to expand a member between the structures and peel the adhesive bond to in turn allow the structures to separate from each other.

BACKGROUND ART

Explosive joints are frequently used in the aerospace and aircraft industries for attaching two structures together when such structures must be quickly separated during flight conditions. Explosive joints have the advantages of providing quick separation and high load carrying capability and of being highly reliable but relatively simple in structure and operation. There are, however, problems associated with the use of explosive joints. The major problem is that such joints generally produce high shock pulses during separation of the structures. These pulses can damage the avionics and adjacent hardware of the structures being separated.

A number of aproaches have been tried to alleviate the effects of the high shock pulses produced by explosive joints. One such approach is to position the avionics in a remote location. This approach usually results in a weight penalty and high density packaging of the avionics in the remote location. The high density packaging in turn causes cooling and access problems. The combination of the weight penalty and the cooling and access problems makes the remote location solution unacceptable in many situations.

Another approach is to provide shock isolation of the avionics; for example, by mounting the avionics package on rubber bushings. This approach is relatively effective but is difficult to design and expensive to carry out. The shock isolation system must be tested and analyzed for a wide range of temperatures. In addition, the system must be designed so that its natural frequency is not harmonic with the structure's frequency, and the appropriateness of the frequency again requires extensive and expensive testing the analysis.

A third approach is to provide shock attenuation within the structure itself. The major drawback to this approach is that in order to provide sufficient shock attenuation, it is necessary to increase the flexibility of the structure. Increasing the flexibility can result in a structure that is so flexible that there are significant stability and control problems.

Apparatus for explosively separating two structures or shattering or rupturing a structure or portion thereof is disclosed in each of the following U.S. Pats. Nos.: 3,135,163, granted June 2, 1964, to G. F. Mechlin, Jr., et al; 3,172,330, granted Mar. 9, 1965, to T. N. G. Lidmalm et al; 3,362,290, granted Jan. 9, 1968, to W. F. Carr et al; 3,453,960, granted July 8, 1969, to H. W. Qualls; 3,465,482, granted Sept. 9, 1969, to J. A. Chandler; 3,486,410, granted Dec. 30, 1969, to V. W. Drexelius et al; 3,505,925, granted Apr. 14, 1970, to W. F. Carr; 3,633,456, granted Jan. 11, 1972, to W. F. Carr et al; 3,698,281, granted Oct. 17, 1972, to O. E. Brandt et al; 4,137,848, granted Feb. 6, 1979, to D. Cunha; and 4,407,468, granted Oct. 4, 1983, to L. J. Bement et al.

Carr et al, U.S. Pat. No. 3,362,290, and Carr, U.S. Pat. No. 3,505,925, each disclose a system in which the products of an explosive charge are contained within a bellows that expands to move a piston to release two structures from each other. Qualls discloses an explosive charge inside a tube which expands upon detonation of the charge to sever a weakened portion of a skin of a structure to separate the structure into two parts. A system in which an explosive charge is detonated inside a flattened tube to expand the tube to a rounded configuration is disclosed by Drexelius et al in U.S. Pat. No. 3,486,410, Carr et al in U.S. Pat. No. 3,633,456, and Cunha in U.S. Pat. No. 4,137,848. In the Drexelius et al and Cunha systems, the expansion of the tube fractures a structure along a weakened line; and in the Carr et al system, the expansion of the tube moves a retaining pin against frictional forces.

Lidmalm et al disclose an end cone for a rocket missile pod carried by an airplane wing. The cone is jettisoned by explosively shattering it. This is accomplished by means of a plurality of spaced apart charges in the form of strips attached to the cone wall and placed between the laminations of the wall. When the charges are detonated, the wall is shattered into many small pieces, and the laminations also tend to be separated from each other. In one embodiment, the laminations are bonded together only at small spaced apart areas to facilitate separation of the laminations.

Chandler discloses a means for removing a protective plastic film from a heat radiator on a spacecraft. In one embodiment, the edge of the plastic film is molded into an elastomeric edge member that encircles the radiator surface and has a flat face which is bonded with a fairly brittle adhesive to the outer surface of the radiator. An explosive charge is molded within the geometric center of the elastomeric edge member and is detonated to expand the edge member in all directions. The expansion of the edge member breaks the adhesive bond and accelerates the edge member away from the radiator surface. The plastic film is pulled away from the spacecraft along with the edge member. In another embodiment, a flattened soft aluminum tube replaces the edge member, and a charge is detonated inside the tube to expand the tube to its original round cross section, to break the adhesive bond and pull the film away from the radiator as in the first embodiment.

Brandt et al disclose an explosive joint having a metal tube of oval cross section enclosed between two doublers. A core of two parallel explosive cords encased in a sheath of silicone rubber are positioned inside the tube. One or both of the explosive cords are detonated to expand the rubber sheath and tube into a round cross section to fracture the doublers along weakened portions formed by grooves or notches.

The known systems and the patents discussed above and the prior art that is discussed and/or cited in the patents should be studied for the purpose of putting the present invention into proper perspective relative to the prior art.

DISCLOSURE OF THE INVENTION

A subject of the invention is apparatus for attaching two structures to each other and for releasing said structures from each other without creating high shock pulses that could damage said structures. According to an aspect of the invention, the apparatus comprises a flange carried by one of the structures. This flange has a side surface positioned to abut a surface of the other of the structures. A layer of adhesive forms an adhesive bond between the surfaces to attach the structures to each other. Release means is provided for peeling the flange away from the other structure to peel the adhesive bond and thereby release the structures from each other. Preferably, the release means is explosively activated.

A preferred feature of the invention is release means that comprises an expandable member positioned between the surfaces and between an outer end of the flange and the layer of adhesive. In the preferred embodiment, explosive means is provided inside the expandable member, and the apparatus also includes detonating means for detonating the explosive means to expand the expandable member and in turn peel the flange away from said other structure. This preferred embodiment of the release means has the advantages of providing quick separation and of being reliable but simple in construction and operation.

The preferred form of the expandable member is a tube having a flattened cross section that expands to an essentially round cross section upon detonation of the explosive means. Preferably, this tube is a metal tube and is filled with an expandable elastomeric material surrounding the explosive means, and the tube and elastomeric material expand to have an essentially round cross section upon detonation of the explosive means. This arrangement has the advantages of being relatively lightweight and simple in construction and of providing a cushioning of the shock of the detonation and a containment of the products of the detonation while minimizing the amount of space occupied.

A preferred feature of the apparatus of the invention is the provision of sealing means between the layer of adhesive and the expandable member to isolate the adhesive from environmental forces that could degrade the adhesive. This helps insure that the structures are held securely together until it is desired to separate the structures and the explosive means is detonated.

The apparatus of the invention may be used for attaching and releasing a variety of types of structures in a variety of relative orientations. For example, according to an aspect of the invention, the apparatus attaches a wall of one structure, which wall has an inner skin, an outer skin, and a core between the skins, to a wall portion of another structure. The flange of the apparatus is a first flange, is formed by an outer end portion of the outer skin, and abuts and is bonded to an outer surface of the wall portion of the other structure. The apparatus further comprises a second flange that is formed by an outer end portion of the inner skin and that abuts an inner surface of the wall portion of the other structure opposite such outer surface. A second layer of adhesive forms an adhesive bond between the second flange and such inner surface. The release means includes means for causing both flanges to peel away from the wall portion of the other structure substantially simultaneously to peel their respective adhesive bonds and thereby release the structures from each other. This combination and arrangement of elements is particularly suitable for use in bonding two stages of a multistage rocket and similar structures together. The arrangement has the advantages of being highly reliable but simple in construction. In addition, the use of the skins of the wall as the bonding flanges helps to keep the total number of parts to a minimum and to minimize the impact of the separable joint on the design of the structures being joined.

Another subject of the invention is a method of attaching a structure having a flange to another structure and of releasing the structures from each other without creating high shock pulses that could damage the structures. According to an aspect of the invention, the method comprises adhesively bonding the flange to the other structure by applying a layer of adhesive between a side surface of the flange and a surface of the other structure. The flange is peeled away from the other structure to peel the layer of adhesive and thereby release said structures from each other. The peeling of the flange may be accomplished in a number of ways. Preferably, an explosive is detonated to cause the flange to peel.

According to a preferred aspect of the invention, an expandable member is positioned between the surfaces and between an outer end of the flange and the adhesive layer. The member is expanded to cause the flange to peel away from the other structure to thereby peel the adhesive layer and release the structures from each other. Preferably, an explosive inside the expandable member is detonated to expand the member. Another preferred feature of the method is the positioning of a seal between the layer of adhesive and the expandable member to isolate the adhesive from environmental forces that could degrade the adhesive.

Still another subject of the invention is a method of attaching a wall of a first structure to a wall portion of a second structure, said wall having an inner skin, an outer skin, and a core between the skins, and of releasing the structures from each other without creating high shock pulses that could damage the structures. According to an aspect of the invention, the method comprises adhesively bonding an outer end portion of the outer skin to an outer surface of the wall portion by applying a first layer of adhesive between the outer skin and the outer surface. An outer end portion of the inner skin is adhesively bonded to an inner surface of the wall portion opposite the outer surface by applying a second layer of adhesive between the inner skin and such inner surface. The outer end portions of the skins are peeled away from the wall portion to peel the layers of adhesive and thereby release the structures from each other.

According to a preferred aspect of the invention, a first expandable member is positioned between the outer skin and the outer surface and between the outer edge of the outer skin and the first layer of adhesive. A second expandable member is positioned between the inner skin and the inner surface and between the outer edge of the inner skin and the second layer of adhesive. These members are expanded to cause the skins to peel away from the wall portion. Preferably, the members are expanded by detonating explosives inside the members.

The method and apparatus of the invention provide an entirely new approach to solving the problem of preventing damage to structures by high shock pulses resulting from the detonation of explosive joints. Each of the previous solutions discussed above approaches the problem by attempting to alleviate the effects of the high shock pulses. The approach of the current invention is to protect the structures by reducing the level of the shock pulses themselves. This is accomplished by providing a joint that can be separated with a much lower shock than is required to separate the joints of known systems. The lower joint-separating shock results in a correspondingly lower shock pulse experienced by the structures being separated.

The method and apparatus of the invention use an adhesive bond for joining the structures and, thus, take advantage of the characteristics of adhesive bonds. These characteristics include a high ratio of shear strength to peel strength. For example, an adhesive bond generally has a shear strength to peel strength ratio of about 8 to 1. This means that the load required to peel the bond is only about one eighth of the load required to shear the bond. Thus, in the system of the invention, an adhesive bond that has a high shear load carrying capability may be peeled with a relatively low input load to separate the structures joined by the bond with a relatively small amount of shock. In contrast, the explosive joints currently in use usually rely on fracturing or shearing a portion of the joint in order to release the connection. The input load required to accomplish such fracturing or shearing is approximately equal to the joint's load carrying capability, and thus a high shock pulse is created.

The method and apparatus of the invention provide an effective and reliable solution to the problem of high shock pulses. The solution is relatively easy and inexpensive to carry out and is readily adaptable to a wide variety of situations and types of structures. The solution of the invention also has the advantages of having only minimal impact on the design of the structures, of being operable under a wide variety of conditions, including outer space, and of requiring only a minimum amount of relatively lightweight compact apparatus.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is a somewhat schematic pictorial view of a multi-stage rocket in which a first and second stage are joined in accordance with a preferred embodiment of the invention.

FIG. 2 is like FIG. 1 except that it shows the two stages following their separation.

FIG. 3 is a fragmentary sectional view taken essentially along the line 3—3 in FIG. 1.

FIG. 4 is an enlarged sectional view of a portion of the apparatus shown in FIG. 3.

FIG. 5 is like FIG. 3 except that it shows the expandable members in an expanded condition and the adhesive bonds beginning to peel.

FIG. 6 is like FIG. 5 except that it shows the two stages fully separated and moving away from each other.

FIG. 7 is a pictorial view of a portion of one of the expandable members, showing the detonating chamber.

BEST MODES FOR CARRYING OUT THE INVENTION

Figure 8:
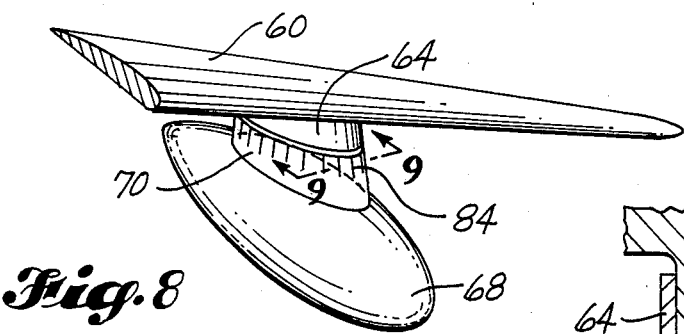
FIG. 8 is a pictorial view of a portion of a wing of an airplane having a payload attached thereto in accordance with another preferred embodiment of the invention.

The drawings show apparatus that is constructed according to the invention and that also constitutes the best modes of the apparatus of the invention currently known to the applicant. The drawings also illustrate the best modes for carrying out the method of the invention currently known to the applicant. In the drawings, the method and apparatus of the invention are shown being used for joining and separating two stages of a rocket and for joining and separating a payload and an airplane wing. It is anticipated that these two types of situations will be the primary applications of the method and apparatus of the invention. However, it is of course to be understood that the method and apparatus of the invention may also be used to advantage in a wide variety of other situations in which it is necessary to provide a bond between two structures that is capable of carrying high loads but that may be separated without subjecting the structures to harmful high shock pulses.

FIGS. 1 and 2 illustrate a multistage rocket 2 of the type used to deliver satellites and the like into orbit. The rocket 2 includes a first stage 4 and a second stage 28. These two stages 4,28 are joined together and then separated by means of a first preferred embodiment of the method and apparatus of the invention. An annular wall 6 of the first stage is separably joined to an annular wall portion 32 of the second stage. The wall 6 of the first stage 4 includes an outer skin 8, an inner skin 10, and a honeycomb core 12 sandwiched between the two skins 8, 10. The wall portion 32 of the second stage 28 is formed by an annular mounting flange 32 that is secured by fasteners 34 to the annular wall 30 of the main body of the second stage 28. The separable joint of the invention is annular and extends all the way around the overlapping annular edges of wall 6 and mounting flange 32. This arrangement insures that the joined stages 4,28 act as a single structure until the system of the invention is activated to separate the stages 4,28.

The structure of the wall 6 of the first stage 4 is modified so that the outer end portions 14,20 of the outer and inner skins 8,10 form mounting flanges for attaching the wall 6 to the second stage 28. The modifications make it possible to use the elements of a known honeycomb wall structure to form a joint with another structure without any significant impact on the overall construction of the wall. The system of the invention keeps the number and complexity of the components to a minimum to thereby enhance the reliability and cost effectiveness of the system.

The honeycomb core 12 of the wall 6 terminates at the inner edge of the outer end portion of the wall 6 that is attached to the second stage 28. Rather than being joined together, the outer end portions or flanges 14,20 of the outer and inner skins 8,10 form two separate annular, radially spaced flanges 14,20. Each flange 14,20 extends axially toward the second stage 28 and defines a recess 16,22 facing the other flange 14,20 for receiving an expandable tube 46,46' described below. Each flange 14,20 terminates in an outer radial end 18,24 that abuts a portion of the second stage 28 and defines the axially outer end of the respective recess 16,22.

The mounting flange 32 carried by the second stage 28 has two annular radial shoulders 36, one extending radially outwardly from the second stage 28 and one extending radially inwardly with respect to stage 28.

These concentric shoulders 36 form abutting surfaces that abut outer ends 18,24 of skin end portions 14,20 of the first stage 4, respectively, when the two stages 4,28 are joined. Each of the concentric inner and outer circumferential surfaces of the mounting flange 32 has two recesses 38 formed therein axially outwardly of the respective shoulder 36. Each of the four recesses 38 extends circumferentially around the flange 32 and receives a seal 44.

FIGS. 3 and 4 illustrate the first and second stages 4,28 joined together by means of the system of the invention. The flange 14 formed by the outer skin 8 abuts the outer circumferential surface of the mounting flange 32 and extends around the circumference of flange 32. Similarly, the flange 20 formed by inner skin 10 abuts the inner circumferential surface of mounting flange 32 around the circumference thereof. A first layer 40 of adhesive forms an annular adhesive bond between flange 14 and flange 32, and a second layer 42 of adhesive forms a concentric adhesive bond between flange 20 and flange 32. A number of known adhesives may be used to form layers 40,42. An example of a suitable adhesive is the high strength, moisture resistant epoxy-based film adhesive sold by American Cyanamid under the designation FM-300. The four seals 44 are positioned to seal the interface between the flanges 14,32 and 20,32 on either axial side of each of the layers 40,42 of adhesive to protect the adhesive from environmental forces that could degrade the adhesive. Protecting the adhesive to maintain its structural strength until it is desired to separate the stages 4,28 is particularly important since the adhesive layers 40,42 form the only structural bond between the stages 4,28.

The recesses 16,22 formed by skin flanges 14,20 of the first stage 4 are positioned axially outwardly of the respective adhesive layers 40,42 and have generally rectangular cross sections to receive the oblong cross sections of expandable members 46,46'. Recess 16 in outer skin 8 receives an expandable metal tube 46, and recess 22 in inner skin 10 receives a concentric expandable metal tube 46'. These tubes 46,46' are essentially identical in construction except that tube 46 has a larger diameter than tube 46'. Each tube 46,46' is essentially filled with an elastomeric material 48, such as silicone rubber. Two explosive cords 50, which may take a variety of known forms, are embedded in the elastomeric material 48 in each tube 46,46'. The cords 50 are spaced from each other and run around the circumference of the respective tube 46,46' and terminate in a detonating chamber 52. See FIG. 7. One such detonating chamber 52 is located in each of the tubes 46,46' at a convenient circumferential location. A conduit 54, for example an electrical conduit, extends from each chamber 52 to the control system of the rocket 2 for remote activation of the explosive release means. When it is desired to separate the stages 4,28, power is supplied to detonating chambers 52 via conduits 54 in order to detonate explosive cords 50. The detonating means inside the chambers 52 may take a variety of known forms. Since such detonating means are well-known in the art, they will not be further described herein.

Figure 9:
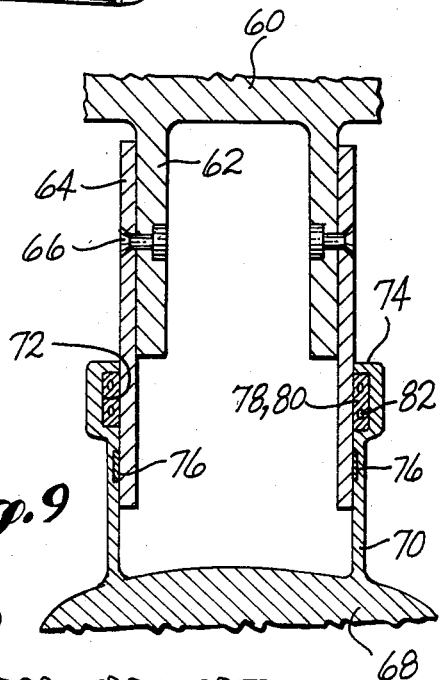
FIG. 9 is a sectional view taken along the line 9—9 in FIG. 8.
Figure 10:
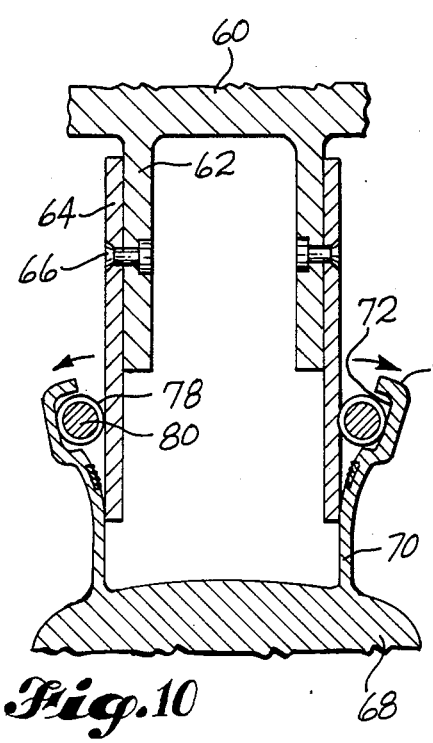
FIG. 10 is like FIG. 9 except that it shows the expandable member in an expanded condition and the adhesive joint peeled apart.
Figure 11:
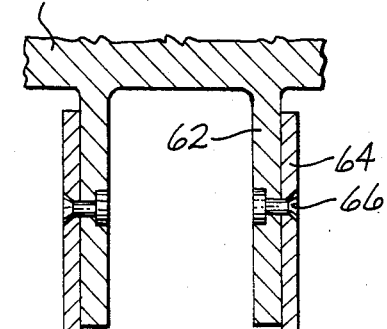
FIG. 11 is like FIG. 10 except that it shows the pylon and payload moving away from the wing structure.

FIGS. 8-11 illustrate another typical application of the system of the invention and another preferred embodiment of the invention. FIG. 8 shows an airplane wing 60 to which a missile pod 68 is separably attached. Referring to FIGS. 9-11, the structure of the wing 60 includes a tubular wing attach flange 62. A tubular mounting member 64 is secured to the attach flange 62 by means of fasteners 66. The missile pod 68 carries a tubular pylon 70 which is separably joined to the mounting member 64 by the system of the invention to separably secure the missile pod 68 to the wing 60.

The structure of the joint and separating means of the embodiment of the invention shown in FIGS. 8-11 differs from the structure of the embodiment shown in FIGS. 1-6 mainly in that a single adhesive bond 76 and a single expandable tube 78 are provided rather than the two adhesive bonds 40,42 and two expandable members 46,46' of the first embodiment. FIG. 9 shows wing 60 and missile pod 68 joined together. Like the outer end portions 14,20 of the skins 8,10 in the first embodiment, the pylon 70 forms a mounting flange that defines a recess 72 with a generally rectangular cross section for receiving the expandable tube 78. The pylon 70 terminates in an outer edge portion 74 which defines one end of the recess 72 and faces the airplane wing 60. The inner circumferential surface of the pylon 70 abuts the outer circumferential surface of the mounting member 64, and the annular adhesive layer 76 bonds pylon 70 to member 64. Adhesive layer 76 is positioned between expandable member 78 and missile pod 68. If desired, seals like the seals 44 of the first embodiment may be provided to protect the adhesive bond 76. Like the expandable tubes 46,46' of the first embodiment, the expandable tube 78 of the second embodiment is filled with an elastomeric material 80 in which two explosive cords 82 are embedded. These explosive cords 82 extend around the pylon 70 to and into a detonating chamber like the chamber 52 shown in FIG. 7.

The separation of the joint of the invention is illustrated in FIGS. 5 and 6 relative to the first embodiment and in FIGS. 10 and 11 relative to the second embodiment. The operation of the first embodiment to separate the stages 4, 28 of the rocket 2 will be described first. When the two stages 4,28 are to be separated, the control system of the rocket 2 causes the explosive cords 50 to be detonated in the detonating chambers 52. Either one or both cords 50 in each tube 46,46' may be detonated, but the detonations in the two tubes 46,46' should be simultaneous to ensure a smooth separation. The detonation of the cords 50 causes the flattened tubes 46,46' to expand simultaneously to a configuration having a round cross section. The elastomeric material 48 in the tubes 46,46' expands to the same configuration to fill the expanded tubes 46,46'. The material 48 serves to cushion the shock of the detonation and assists the tubes 46,46' in containing the products of the detonation.

FIG. 5 shows the configuration of the joint shortly after detonation. The expandable tubes 46,46' and the elastomeric material 48 have expanded to round cross sectional configurations and have started to peel the skin flanges 14,20 away from the mounting flange 32 of the second stage 28. In addition, the peeling away of the skin flanges 14,20 is beginning to peel the adhesive layers 40,42 to peelingly release the two adhesive bonds. FIG. 6 illustrates the apparatus of the invention after the skin flanges 14,20 have moved away from the mounting flange 32 enough to completely peel both adhesive layers 40,42. With the layers 40,42 peeled, the stages 4,28 are free to move away from each other, and FIG. 6 shows them separating from each other. In most applications, it is preferable to provide some means for insuring that the stages 4,28 fully separate following release of the adhesive bonds 40,42. Such means may take a variety of forms, such as control system rockets or springs. Since the separating means does not form a part of the present invention, it will not be discussed further herein.

Referring to FIGS. 10 and 11, the joint of the second embodiment is separated in much the same way as the joint of the first embodiment. One or both of the explosive cords 82 are detonated to expand the metal tube 78 and the elastomeric material 80. The expansion of the tube 78 causes the pylon 70 to peel away from the mounting member 64 and thereby peel the adhesive bond 76, as shown in Fig. 10. Following peeling of the bond, air pressure or some mechanism separates the missile pod 68 from the wing 60. FIG. 11 illustrates the missile pod 68 moving away from the wing 60.

In both of the preferred embodiments, and in other embodiments of the invention having an annular adhesive bond line, it is generally preferable to provide the flange 70 or flanges 14,20 with slots such as the slots 84,26 shown in FIGS. 1, 2 and 8. The slots 84,26 facilitate the peeling of flange 70 and flanges 14,20, respectively, and prevent the development of hoop tension which could inhibit such peeling.

It should be obvious to those skilled in the art to which this invention is addressed that the invention may be used to advantage in a variety of situations and that various modifications, changes, and omissions in form and detail may be made without departing from the spirit and scope of the invention as defined by the following claims.

What is claimed is:

1. Apparatus for attaching two structures to each other and for releasing said structures from each other without creating high shock pulses that could damage said structures, said apparatus comprising:
   a flange carried by one of said structures; said flange having a side surface positioned to abut a surface of the other of said structures;
   a layer of adhesive forming an adhesive bond between said surfaces to attach said structures to each other; and
   release means for peeling said flange away from said other structure to peel said adhesive bond and thereby release said structures from each other; said release means comprising an expandable member positioned between said surfaces and, in a direction parallel to said surfaces, between an outer end of said flange and said layer of adhesive, and means for expanding said member perpendicular to said surfaces to peel said flange.

2. Apparatus as described in claim 1, in which said release means comprises explosive means inside said member, and detonating means for detonating said explosive means to expand said member and in turn peel said flange away from said other structure.

3. Apparatus as described in claim 2, in which said member is a tube having a flattened cross section that expands to an essentially round cross section upon detonation of the explosive means.

4. Apparatus as described in claim 3, further comprising sealing means between the layer of adhesive and the expandable member to isolate the adhesive from environmental forces that could degrade the adhesive.

5. Apparatus as described in claim 2, in which said member is a metal tube that has a flattened cross section and is filled with an expandable elastomeric material surrounding the explosive means, and said tube and elastomeric material expand to have an essentially round cross section upon detonation of the explosive means.

6. Apparatus as described in claim 5, further comprising sealing means between the layer of adhesive and the expandable member to isolate the adhesive from environmental forces that could degrade the adhesive.

7. Apparatus as described in claim 2, further comprising sealing means between the layer of adhesive and the expandable member to isolate the adhesive from environmental forces that could degrade the adhesive.

8. Apparatus as described in claim 1, in which said release means comprises explosive means and detonating means for explosively activating the release means.

9. Apparatus as described in claim 1:
   in which said one structure includes a wall having an inner skin, an outer skin, and a core between said skins; and said flange is a first flange, is formed by an outer end portion of said outer skin, and abuts and is bonded to an outer surface of a wall portion of said other structure;
   which further comprises a second flange that is formed by an outer end portion of said inner skin and that abuts an inner surface of said wall portion opposite said outer surface, and a second layer of adhesive forming an adhesive bond between the second flange and said inner surface; and
   in which the release means includes means for causing both flanges to peel away from said wall portion substantially simultaneously to peel their respective adhesive bonds ad thereby release said structures from each other; and said release means comprises a second expandable member positioned between said second flange and said inner surface and, in a direction parallel to said inner surface, between an outer end of said second flange and the second layer of adhesive, and means for expanding said second member perpendicular to said inner surface and said second flange to peel said second flange.

10. Apparatus as described in claim 9, in which said release means includes explosive means inside said expandable members, and means for detonating said explosive means to expand said members and in turn peel said flanges away from said wall portion.

11. Apparatus as described in claim 10, further comprising sealing means between each layer of adhesive and the corresponding expandable member to isolate the adhesive from environmental forces that could degrade the adhesive.

12. Apparatus as described in claim 9, in which the release means comprises explosive means and detonating means for explosively activating the release means.

13. A method of attaching a structure having a flange to another structure and of releasing said structures from each other without creating high shock pulses that could damage said structures, said method comprising:
   adhesively bonding said flange to said other structure by applying a layer of adhesive between a side surface of said flange and a surface of said other structure;
   positioning an expandable member between said surfaces and, in a direction parallel to said surfaces, between an outer end of said flange and said layer; and
   expanding said member perpendicular to said surfaces, to peel said flange away from said other structure to peel said layer and thereby release said structures from each other.

14. A method as described in claim 13, in which the step of expanding said member comprises detonating an explosive inside said member.

15. A method as described in claim 14, further comprising positioning a seal between said layer and said expandable member to isolate the adhesive from environmental forces that could degrade the adhesive.

16. A method as described in claim 13, comprising detonating an explosive to cause said flange to peel away from said other structure.

17. A method of attaching a wall of a first structure to a wall portion of a second structure, said wall having an inner skin, an outer skin, and a core between said skins, and of releasing said structures from each other without creating high shock pulses that could damage said structures, said method comprising:

adhesively bonding an outer end portion of said outer skin to an outer surface of said wall portion by applying a first layer of adhesive between said outer skin and said outer surface;

adhesively bonding an outer end portion of said inner skin to an inner surface of said wall portion opposite said outer surface by applying a second layer of adhesive between said inner skin and said inner surface;

positioning a first expandable member between said outer skin and said outer surface and, in a direction parallel to said outer surface, between the outer edge of said outer skin and said first layer, and positioning a second expandable member between said inner skin and said inner surface and, in a direction parallel to said inner surface, between the outer edge of said inner skin and said second layer; and expanding said first and second members perpendicular to said outer surface and said outer skin and to said inner surface and said inner skin, respectively, to peel said outer end portions away from said wall portion to peel said layers of adhesive and thereby release said structures from each other.

18. A method as described in claim 17, in which the step of expanding said members comprises detonating explosives inside said members.

19. A method as described in claim 18, further comprising positioning a seal between each layer of adhesive and the corresponding expandable member to isolate the adhesive from environmental forces that could degrade the ahdesive.

20. A method as described in claim 17, comprising detonating an explosive to cause said outer end portions to peel away from said wall portion.

* * * * *